US011389697B2

(12) United States Patent
Curley et al.

(10) Patent No.: US 11,389,697 B2
(45) Date of Patent: Jul. 19, 2022

(54) TEAM MANAGEMENT AND COGNITIVE REINFORCEMENT SYSTEM AND METHOD OF USE

(71) Applicant: DIGITAL COACHES LLC, Caldwell, NJ (US)

(72) Inventors: James Curley, Caldwell, NJ (US); Diane Palla, Harrison, NJ (US)

(73) Assignee: DIGITAL COACHES LLC, Caldwell, NJ (US)

( * ) Notice: Subject to any disclaimer, the term of this patent is extended or adjusted under 35 U.S.C. 154(b) by 1074 days.

(21) Appl. No.: 15/484,801

(22) Filed: Apr. 11, 2017

(65) Prior Publication Data

US 2017/0291068 A1    Oct. 12, 2017

Related U.S. Application Data

(60) Provisional application No. 62/320,879, filed on Apr. 11, 2016.

(51) Int. Cl.
| | | |
|---|---|---|
| A63B 24/00 | (2006.01) | |
| G06Q 10/10 | (2012.01) | |
| G06Q 50/20 | (2012.01) | |
| G09B 7/08 | (2006.01) | |
| G09B 7/07 | (2006.01) | |
| G09B 5/02 | (2006.01) | |

(52) U.S. Cl.
CPC ...... *A63B 24/0075* (2013.01); *A63B 24/0062* (2013.01); *G06Q 10/1093* (2013.01); *G06Q 50/205* (2013.01); *G09B 5/02* (2013.01); *G09B 7/07* (2013.01); *G09B 7/08* (2013.01)

(58) Field of Classification Search
CPC ............ A63B 24/0062; A63B 24/0075; G06Q 50/205; G06Q 10/1093; G09B 19/0038; G09B 7/08; G09B 5/02; G09B 7/07
See application file for complete search history.

(56) References Cited

U.S. PATENT DOCUMENTS

| | | |
|---|---|---|
| 6,073,489 A | 6/2000 | French et al. |
| 6,445,364 B2 | 9/2002 | Zwern |
| 7,887,329 B2 | 2/2011 | Greenshpan et al. |
| 8,670,648 B2 | 3/2014 | Thompson et al. |
| 8,744,869 B2 | 6/2014 | Graff et al. |
| 2001/0038378 A1* | 11/2001 | Zwern ...................... G09B 9/00 345/156 |

(Continued)

FOREIGN PATENT DOCUMENTS

| | | |
|---|---|---|
| EP | 2309365 A2 | 4/2011 |
| JP | 2014509892 A | 4/2014 |

(Continued)

OTHER PUBLICATIONS

STRIVR, Product Website, "About STRIVR", http://www.strivr.com/about/, accessed Feb. 5, 2018.

(Continued)

*Primary Examiner* — Nathan Hillery
(74) *Attorney, Agent, or Firm* — MG Miller Intellectual Property Law LLC

(57) ABSTRACT

A system that providing an interactive means for one or more team members to learn about and better-react to opponents in upcoming games is provided. The system operates by repeatedly running drill sessions having a dynamic difficulty, where the difficulty is automatically set, based on the success of the player performing the drill session, and other characteristic about the player.

12 Claims, 3 Drawing Sheets

(56) References Cited

U.S. PATENT DOCUMENTS

| | | |
|---|---|---|
| 2002/0021283 A1* | 2/2002 | Rosenberg ............ A63F 13/285 |
| | | 345/156 |
| 2003/0142238 A1 | 7/2003 | Wasack et al. |
| 2004/0162803 A1 | 8/2004 | Rhoads |
| 2006/0003298 A1* | 1/2006 | Greenshpan ....... A63B 24/0003 |
| | | 434/247 |
| 2006/0281061 A1 | 12/2006 | Hightower et al. |
| 2009/0076843 A1* | 3/2009 | Graff ...................... G06Q 10/10 |
| | | 705/2 |
| 2012/0027379 A1* | 2/2012 | Thompson ............... H04N 5/76 |
| | | 386/241 |
| 2013/0330693 A1 | 12/2013 | Sada et al. |
| 2015/0024357 A1 | 1/2015 | Faubert et al. |
| 2016/0310059 A1* | 10/2016 | Faubert .................. A61B 5/168 |
| 2017/0046967 A1* | 2/2017 | Sundquist ............... A63B 69/00 |

FOREIGN PATENT DOCUMENTS

| | | |
|---|---|---|
| WO | 2004006747 A2 | 1/2004 |
| WO | 2004006747 A3 | 1/2004 |
| WO | 2014146192 A1 | 9/2014 |
| WO | 2015089673 A1 | 6/2015 |
| WO | 2015112646 A1 | 7/2015 |

OTHER PUBLICATIONS

U.S. Army, GoArmy Edge Press Release, "U.S. Army Launches GoArmy Edge App for Coaches and Athletes", U.S. Army, Alexandria, VA and Canton, OH, Aug. 6, 2015, https://assets.goarmyedge.com/Edge/201706/goarmy-edge-press-release.pdf, accessed Feb. 5, 2018.

Michael Hicks, "Former New York Yankees slugger is training amateurs to hit a home run—in VR", Website, Nov. 17, 2015, Techradar, http://www.techradar.com/news/wearables/former-new-york-yankees-slugger-is-training-amateurs-to-hit-a-home-run-in-vr-1309123, accessed Feb. 5, 2018.

Axon Sports, Product Website, "Our Solutions", https://www.axonsports.com/our-solution/, accessed Feb. 5, 2018.

* cited by examiner

TEAM MANAGEMENT AND COGNITIVE REINFORCEMENT SYSTEM AND METHOD OF USE

CLAIM OF PRIORITY

This application claims priority to U.S. Provisional Patent Application No. 62/320,879, entitled "TEAM MANAGEMENT AND COGNITIVE REINFORCEMENT SYSTEM AND METHOD OF USE," filed on Apr. 11, 2016, the contents of which are hereby incorporated by reference, including the specification.

FIELD OF THE EMBODIMENTS

The field of the present invention and its embodiments relates to a system for team management and cognitive reinforcement for the players on said team. In particular, the present invention relates to a system that provides an interactive means for one or more team members to learn about and better react to opponents in upcoming games by repeatedly running drill sessions of a dynamic difficulty, where the difficulty is automatically set, based on the success of the player performing the drill session.

BACKGROUND

For as long as sports have existed, coaches have been scouting their opponents to find critical information and have been using that information to better prepare their team members to play against said opponent. Despite the best efforts of coaches, and due to the time constraints placed on many teams due to the schedule of their players, in-person practice fails to adequately prepare the players for an upcoming matchup, especially on sports teams with a large amount of members. While there are some aspects of preparation that cannot be replicated outside of in-person practice, many more aspects of preparation do not require the in-person attention of a coach.

One such aspect of preparation is reviewing an opponent's basic offensive and defensive strategies, formations, and plays. In American football, for example, during the few days immediately prior to a competition, team members regularly perform many drills against players running their opponent's various offensive and defensive strategies, formations, and plays. Usually second- and third-string athletes act as the opponent in the hopes of giving the first-string athletes a good idea of what their opponent will do during the upcoming competition.

One problem with this arrangement is that the second- and third-string athletes do not get to practice the plays of their own team, as they are busy preparing the first-string players. As such, when a first-string player gets hurt during a game, the second- or third-string player is not adequately prepared to be substituted in.

Another problem with this arrangement is that the second- and third-string athletes are rarely familiar with the opponent's offense and defense, which presents many inefficiencies in running these plays, as the second- and third-string athletes often have questions about where to line-up, who to block, where the point of attack is, who gets the ball and where, how far down the field or court one should go, and what defense and/or coverage they are supposed to be in, among other things. The amount of time required to ask and address all of these questions during a practice where time is already the limiting factor puts serious strain on the efficacy of practice. Further, when the athletes choose to not ask these questions, mistakes frequently get made, thus detracting from the value of the drill to the first-string athletes.

Moreover, even if the above problems do not occur, additional failures in this arrangement arise due to the disparity in athletic ability between first-string athletes and their backups. This disparity is particular pronounced in basketball, where the starters will not be adequately challenged, both physically and mentality. There, the starters will not be forced to utilize and practice more advanced techniques, preventing them from improving their overall abilities in time for their next competition. In American football, this disparity can manifest in a number of catastrophic ways. For example, the players who line up on the line of scrimmage may not be familiar with the techniques and knowledge required to successfully execute the called play.

In addition to the above-mentioned problems, time restraints on in-person practice can become more pronounced when some athletes require extra time to understand or learn what is being taught. When these players who require additional time are not first-string athletes, the fact that they typically participate in fewer practice repetitions leaves those players effectively unable to adequately prepare for an upcoming matchup. This is particularly true for students with learning disabilities. When all of the above is combined with the fact that in some sports a coach is also responsible for up to 100+ athletes, the ability of the coach to check for retention of all of the necessary information in each player is difficult if not impossible.

As such, there exists a need for an invention that can enable athletes on various sports teams to engage in effective preparation outside of in-person practice such that all players on said team can be prepared for an upcoming competition, regardless of time constraints imposed on in-person practice.

Review of Related Technology:

U.S. Pat. No. 8,744,869 pertains to a team communication platform that combines messaging, video, testing, reporting, work flow diagramming, presentations, and performance analysis into a portal system that is made mobile through the use of synchronization services.

U.S. Pat. No. 8,670,648 pertains to video processing methods that include correlating a video frame in a video stream with event data in a data stream based on a video frame time stamp and an event data time stamp, the time stamps being based on a time scale that is independent, and recording the correlation in a database. Other video processing methods include receiving a query for a video frame and searching for event data in a database. The database has an event data table and a video data table used in locating the video frame. Further video processing methods include receiving a query to retrieve a video clip for each of a plurality of plays, searching for event data in a database, locating the video clip for each of the plurality of plays, and compiling the video clips into a compiled video stream lacking video frames that do not satisfy the query.

U.S. Pat. No. 7,887,329 pertains to a system and method for training a subject for control processes, preferably for a particular task. The task may optionally comprise a sport, such as basketball for example; additionally or alternatively, the task may comprise an area of skills to be improved, such as general improvement of physical reflexes and/or reactions. The present invention enables cognitive skills associated with the task to be improved, without requiring physical fidelity to the physical actions that are normally performed during the actual task. Improving these cognitive skills results in improved control processes during performance of the actual task by the subject.

U.S. Pat. No. 6,445,364 pertains to a virtual computer monitor is described which enables instantaneous and intuitive visual access to large amounts of visual data by providing the user with a large display projected virtually in front of the user. The user wears a head-mounted display containing a head-tracker, which together allow the user to position an instantaneous viewport provided by the head-mounted display at any position within the large virtual display by turning to look in the desired direction. The instantaneous viewport further includes a mouse pointer, which may be positioned by turning the user's head, and which may be further positioned using a mouse or analogous control device. A particular advantage of the virtual computer monitor is intuitive access to enlarged computer output for visually-impaired individuals.

U.S. Pat. No. 6,073,489 pertains to a system for assessing a user's movement capabilities creates an accurate simulation of sport to quantify and train several novel performance constructs by employing: proprietary optical sensing electronics for determining, in essentially real time, the player's positional changes in three or more degrees of freedom; and computer controlled sport specific cuing that evokes or prompts sport specific responses from the player. In certain protocols of the present invention, the sport specific cuing may be characterized as a "virtual opponent", that may be kinematically and anthropomorphically correct in form and action. Though the virtual opponent could assume many forms, the virtual opponent is responsive to, and interactive with, the player in real time without any perceived visual lag. The virtual opponent continually delivers and/or responds to stimuli to create realistic movement challenges for the player. The movement challenges are typically comprised of relatively short, discrete movement legs, sometimes amounting to only a few inches of displacement of the player's center of mass. Such movement legs are without fixed start and end positions, necessitating continual tracking of the player's position for meaningful assessment. The virtual opponent can assume the role of either an offensive or defensive player.

United States Patent Publication No.: 2003/0142238 pertains to a method and system for triggering, composing, and displaying presentations of a live event, such as a sporting event. Prior to the event, data characterizing a set of triggering events and data characterizing a set of layout rotations is stored. Each layout rotation includes one or more layouts, and each of the layout rotations is associated with one of the triggering events. During the live event, instances of the triggering events are detected, at which time the associated layout rotation is automatically initiated.

United States Patent Publication No.: 2004/0162803 pertains to a computer method and system that permits a single personal computer sports software application program and its related user interface to store, display, organize, analyze, output and otherwise manage information specific to any one of a number of different sports. Sports data is maintained within a sports season data entity (i.e., Season) that is comprised of, or references, games or similar season events and related information including game scores, rosters, player statistics, game notes, pictures and multimedia. Seasons are implemented in a modular form that enables the program to dynamically load the season's sports data. Seasons also reference independent sport packages that contain statistic definitions or other information specific to a given sport. Using the information contained within the Season and associated sport package, the program reconfigures its user interface, displayed data, output, and other properties where necessary to accommodate any sport specific requirements.

United States Patent Publication No.: 2006/0003298 pertains to a system and method for training a subject for control processes, preferably for a particular task. The task may optionally comprise a sport, such as basketball for example; additionally or alternatively, the task may comprise an area of skills to be improved, such as general improvement of physical reflexes and/or reactions. The present invention enables cognitive skills associated with the task to be improved, without requiring physical fidelity to the physical actions that are normally performed during the actual task. Improving these cognitive skills results in improved control processes during performance of the actual task by the subject.

United States Patent Publication No.: 2006/0281061 pertains to a simulation system for training athletes in cognitive skills includes hardware incorporating imaging and tracking devices, sound generator and receiver, a projection screen, and a movie projector for creating a virtual environment that simulates the site specific to the sport. The system includes software installed on a processor that is in signal communication and in controlling relation to the hardware elements. The system inputs to the software a plurality of scenarios in which the athlete might find him/herself. The software acts to retrieve a scenario and output a plurality of control signals for presenting a visual and aural simulation. A body parameter is tracked in temporal coordination with elements of the scenario. The tracked parameter is saved for later review by the user and, in some cases, training personnel. The scenario evolves in response to the tracked parameter, and is thus interactive in nature.

In United States Patent Publication No.: 2013/0330693, according to methods for teaching high performance cognitive skills, a simulated sports action scenario is displayed on a screen to a user, and the user is queried to respond to the scenario. The user's response to the scenario is received. The user's response to the scenario is evaluated according to predetermine high performance cognitive skills criteria to determine a sports relevant score. The determined sports relevant score is then displayed to the user and a database is updated.

United States Patent Publication No.: 2015/0024357 pertains to a present disclosure relates to a perceptual-cognitive-motor learning system. The system includes an apparatus for evaluating or improving perceptual-cognitive abilities of a subject during a training sequence. The system also has a training sequence controller for adding in at least a part of the training sequence at least one of (a) a first motor load add-on to the subject and (b) a second motor load add-on to the subject, the second motor load being heavier than the first motor load. A variant of the system has a user interface for allowing the subject to change at least one parameter of the training sequence. Methods for evaluating or improving perceptual-cognitive abilities of a subject are also disclosed.

International Patent Application No.: WO2015112646 pertains to a sports training system designed to provide an immersive simulation of at least part of a set of an opposing team in response to the actual actions of a player.

International Patent Application No.: WO2015089673 pertains to a system and a method for determining a perceptual-cognitive signature of a subject. A plurality of objects moves at a controlled speed on a visual display, for a predetermined duration in each of a series of core trials. The subject identifies one or more target objects amongst the plurality of objects. The perceptual-cognitive signature of the subject is determined according to the number of target objects, the speed of the objects, the predetermined duration of each of the series of core trials, and a correctness of identifications, by the subject after each predetermined duration, of the target objects over the series of core trials.

International Patent Application No.: WO2014146192 pertains to perceptual-cognitive-motor learning system. The system includes an apparatus for evaluating or improving perceptual-cognitive abilities of a subject during a training sequence. The apparatus includes a display configured to provide to the subject a visual contact with an environment. The system also has a training sequence controller configured to consolidate results of first successive tests made using a single spatial zone formed by the environment, segment the into a plurality of spatial zones, and consolidate results of second successive tests made using the plurality of spatial zones. Methods for evaluating or improving perceptual-cognitive abilities of a subject are also disclosed.

International Patent Application No.: WO2004006747 pertains to system and method for training a subject for control processes of a particular task by analyzing a plurality of action to determine a plurality of cognitive actions (100), designing a plurality of cognitive skills for training the subject in the task (102), determining a training strategy according to the plurality of cognitive skills (104), constructing a trainer for training the subject according to the training strategy (106), determining a training plan for training the subject (1070), and testing and calibrating an operation of the trainer during interactions with the subject (108).

European Patent No.: 2309365 pertains to a method and apparatus for providing force feedback to a user operating a human/computer interface device (14) and interacting with a computer-generated simulation (20). In one aspect, a computer implemented method simulates the interaction of simulated objects displayed to a user who controls one of the simulated objects by manipulating a physical object (34) of an interface device (14). The physical object provides force feedback to the user which imparts a physical sensation corresponding to the interaction of the computer simulated objects.

European Patent No.: 1554709 pertains to a system and method for training a subject for control processes of a particular task by analyzing a plurality of action to determine a plurality of cognitive actions (100), designing a plurality of cognitive skills for training the subject in the task (102), determining a training strategy according to the plurality of cognitive skills (104), constructing a trainer for training the subject according to the training strategy (106), determining a training plan for training the subject (1070), and testing and calibrating an operation of the trainer during interactions with the subject (108).

Japanese Patent Application No.: 2014509892 pertains to a simulated sports action scenario is displayed on a screen to a user, and the user is queried to respond to the scenario. The user's response to the scenario is received. The user's response to the scenario is evaluated according to predetermine high performance cognitive skills criteria to determine a sports relevant score. The determined sports relevant score is then displayed to the user and a database is updated.

For the foregoing reasons, there is a need for a system and method that enables athletes on sports teams to engage in effective preparation outside of in-person practice such that all players on said team can be prepared for an upcoming competition, regardless of time constraints imposed on in-person practice.

SUMMARY

The present disclosure provides a method and system to implement said method that satisfies this need. Specifically, the present disclosure provides for a method for providing a cognitive reinforcement system for at least one player on a sports team via a multi-tenant computerized system. The method starts with first selecting, by one of the players, a drill from a list of pre-selected drills. Once the drill has been selected, the system will find a drill session having a list of information, where the drill session is associated with the selected drill and the player. Once the drill session has been found, the system retrieves a plurality of components of the drill session based on the list of information. Preferably, the list of information will contain a unique session ID, a drill type, a player position for the player, a baseline session flag, a level indicator corresponding to a predetermined amount of levels, and a count of how many times the player has performed the drill. After the system has retrieved the plurality of components, the system will assemble the drill session from said components, and then allows the player to start the drill session. In some embodiments, the player is presented with a set of instructions of how to perform the drill.

Upon accessing the drill session, embodiments exist where the system will then select, via randomization, a drill animation to be used in the drill session. This may be a true randomization or may be a weighted-randomization, where the randomization is weighted based on the list of information mentioned above. The system then displays this animation to the user for a predetermined amount of time. This predetermined amount of time preferably corresponds to the level indicator. The animation may be an animated or cartoon-like animation, or may be a video uploaded to the system. The video can also be real game footage of an opponent. After the player has seen the drill animation for the preselected amount of time, the system presents the player with a question pertaining to the drill animation to the player. The player then selects an answer to this question, and the system subsequently determines whether the answer is a correct response to the question. In some embodiments, the question is presented at the same time that the drill animation is being played.

If the player selected the correct answer, embodiments of the method exist where the system then records that a correct response was selected. This event is then used by the system to calculate a running grade for the drill session and then the system saves the running grade, the player position, the drill type, the count, the correct response, and the selected answer. Once this information has been saved, the system checks if the running grade qualifies the player to enter a different level. If the running grade is high enough to meet a predetermined threshold, the system will raise the level indicator associated with the player, moving them to a higher level. If the running grade is low enough to pass below a different predetermined threshold, the system will lower the level indicated associated with the player, moving them to a lower level. Preferably, the system will have a number of levels a player can achieve, and the levels will correspond to the likelihood that the player will successfully answer the correct question, demonstrating mastery of the drill. That is, the lower levels will be of the lowest difficulty, while the higher levels will present the highest difficulty.

The present disclosure also contemplates an apparatus for providing a cognitive reinforcement system for one or more players on a sports team. The apparatus includes a client-server computer system including a server computer connected to a plurality of client computers over a wide area network. Preferably, the server computer system has a team administration module, a playbook module, a schedule keeping module, and a grading module all in electronic communication with each other. In some embodiments, the team administration module creates and maintains a team schedule as well as stores contact information and position information for the one or more players, information about one or more opponents, at least one essay, at least one quiz, and the team schedule. The grading module provides access to a running grade and a level of at least one player. In some embodiments, the playbook module creates at least one playbook, allows documents to be uploaded to the server computer, provides access to at least one playbook, and sets the preferences for a team offense and a team defense. In one embodiment the schedule keeping module allows the player to participate in one or more drills, and in another embodiment the schedule keeping module uploads a scouting report, views the scouting report, views and edits at least one video clip, and enters situational data and results data pertaining to the at least one video clip. In a preferred embodiment, the team administration module includes a contact information submodule, a schedule management submodule, a drill settings submodule, an opponent submodule, and an offensive and defensive submodule. In another preferred embodiment, the schedule keeping module includes a drill simulator submodule and a video editor submodule. In yet another preferred embodiment, the client computer provides access to the drill simulator submodule and the video editor submodule, and allows a user to view a grade and level associated with one or more of the one or more players.

In many embodiments, the drill simulator submodule is configured to improve the cognition of the player in relation to one or more drills related to one or more sports. Preferably, the drill simulator submodule continuously provides one or more drills for a player to perform within the system, increases the grade upon the player successfully performing the drill, increases the level upon the player obtaining a predetermined grade for the current level, and establishes where the maximum level that can be achieved corresponds to the maximum likelihood that the player will successfully perform the drill. In another preferred embodiment, the drill simulator submodule continuously provides one or more drills for a player to perform within the system, the drill simulator submodule decreases the grade upon the player unsuccessfully performing the drill, the drill simulator submodule decreases the level upon the player obtaining a predetermined grade for the current level, and establishes where the minimum level that can be achieved corresponds to the minimum likelihood that the player will successfully perform the drill.

Preferably, the present invention will be distributed via the Internet, allowing athletes to perform drills anywhere where they can receive an internet connection. Further, this increased access allows an athlete to engage in far more digital drill sessions in a short period of time when compared with performing these drill sessions in-person. Moreover, because system and method according to the present disclosure is available year-round, the players will have the opportunity to sharpen their skills in and out of season.

These and other features, aspects, and advantages of the present invention will become better understood with reference to the following description and appended claims.

DESCRIPTION OF THE PREFERRED EMBODIMENTS

Figure 1:
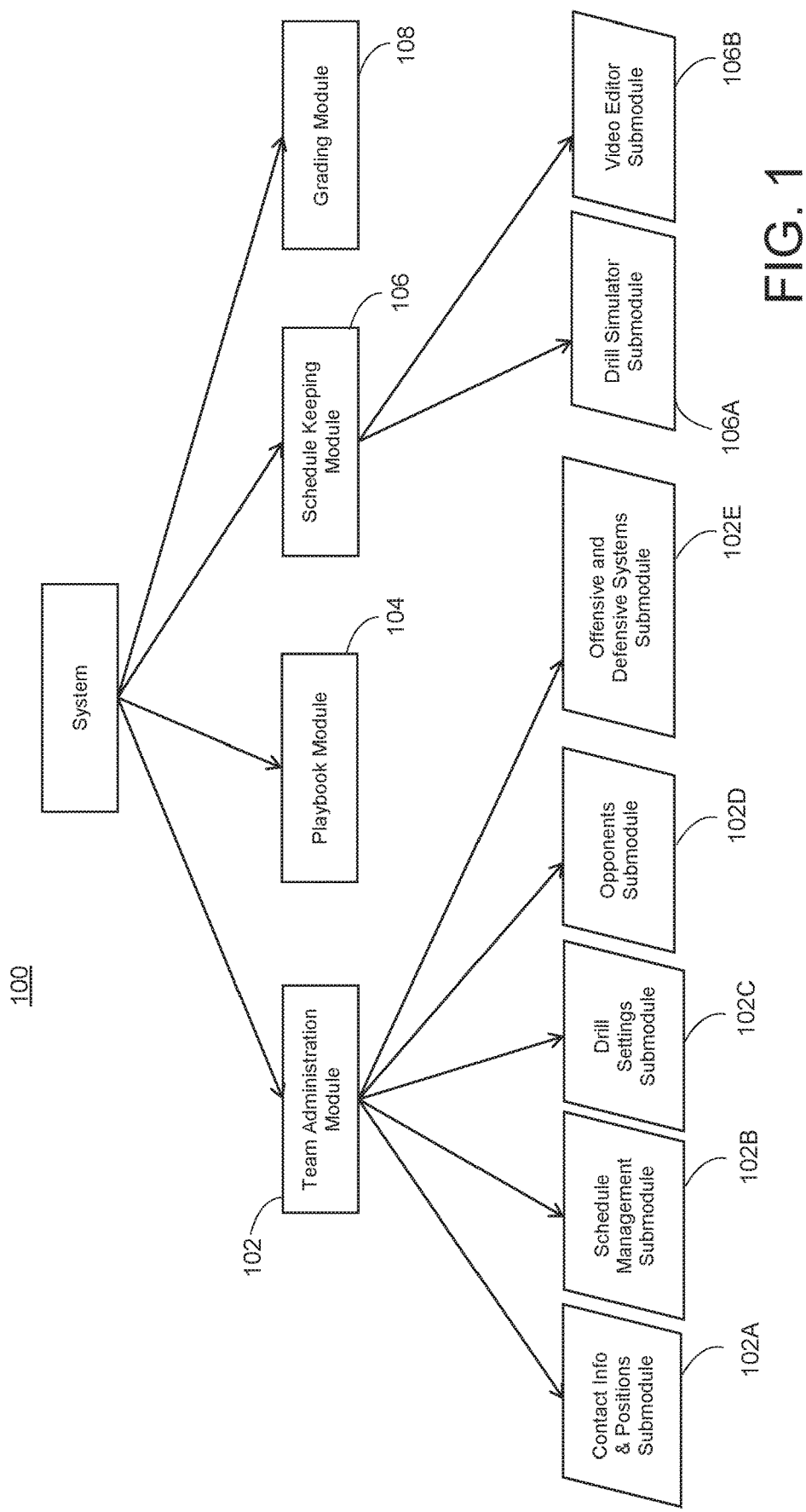
FIG. 1 shows a diagram of an embodiment of the apparatus in accordance with the present disclosure, showing the modules and submodules of the apparatus.

The preferred embodiments of the present invention will now be described with reference to the drawings. Identical elements in the various figures are identified with the same reference numerals.

Reference will now be made in detail to each embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

While the disclosure refers to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation, or material to the teachings of the disclosure without departing from the spirit thereof. Therefore, it is intended that the disclosure not be limited to the particular embodiments disclosed.

There are two primary use cases for the system and method described by the present disclosure. The first is for a coach of a sports team to manage the team using the teachings contained herein, by having the players on the team utilize the system in accordance with the present invention over the course of a season while the coach monitors the players progress. The second is for a player to unilaterally use the system in accordance with the present disclosure, after the system has been set up, so that the player may improve their skills entirely on their own.

Referring to FIG. 1, a system 100 in accordance with the present disclosure is shown. The first use case shall be described with reference to FIG. 1. Here, the system 100 includes four modules, a team administration module 102, a playbook module 104, a schedule keeping module 106, and a grading module 108. The team administration module 102 has a contact information and positions submodule 102A, a schedule management submodule 102B, a drill settings submodule 102C, an opponents submodule 102D, and an offensive and defensive systems submodule 102E. The schedule keeping module 106 has a drill simulator submodule 106A and a video editor submodule 106B.

Here, the team administration module 102 allows a coach to create, modify, and maintain a schedule containing, things such as all of the competitions for the upcoming and/or current season, the dates of the competitions, and the names of the opponents for each competition, which occurs in a schedule management submodule 102B. In one embodiment, the coach can add additional upcoming competitions during the season, in the schedule management submodule 102B. This feature will be beneficial if the sports team qualifies for post-season competition, if the team has to make up for a previously-canceled competition, or for any other reason that the coach needs to enter dates outside of the sports team's competitive season. One reason for this would be if the coach wanted their athletes to participate in drills in a drill simulator submodule 106A during the offseason to prepare for future competitions, and another reason is for the athletes to get used to viewing and reacting to, a particular opponent, or a particular set of strategies, formations, and/or plays. These dates could serve as deadlines for the players to complete their drills by.

In many embodiments, the coach will be able to import information and data, within the schedule keeping module 106 and/or a video editor submodule 106B, from one competition to another. In one example, the sports team is preparing for an upcoming opponent that has similar or identical strategies, formations, and/or plays as a previous opponent. The coach, within the schedule keeping module 106 and the video editor submodule 106B, can view all of the video clips, "situational data," and "results data" that was inputted, and simply associate that data with the upcoming opponent. Another situation where this feature is beneficial is when the sports team faces an opponent year-after-year and the opponent does not change their strategy between years, allowing the coach to avoid duplicative effort.

In one preferred embodiment, the team administration module 102, via an offensive and defensive systems submodule 102E, a coach may view literature about popular offenses and defenses in sports. Preferably, the system will use generic language in reference to various strategies, formations, and plays so that that regional or linguistic differences between what similar items are called do not meaningfully affect the use of the present invention. Preferably, a number of essays exist where the essays are tutorials written from the perspective of being in opposition to that particular strategy. The essays also can include additional information, such as what weaknesses the strategy has and how that strategy can be defeated. In one embodiment, the coach can assign a particular article to the sports team. In another embodiment, the present invention will also administer quizzes about those essays at the end of the reading within the offensive and defensive systems submodule 102E. Upon completion of the quiz, the athlete will receive a percentage grade based on the number of correct answers out of the total number of questions provided. The coach and player will have access to those grades in the grading module 108 to observe how well they understood the strategies in the article.

In one embodiment, the coach can also upload the team's playbook within the playbook module 104. In a separate embodiment, the coach can create a playbook within the present invention by selecting, labeling, and submitting strategies, formations, and plays within the playbook module 104. While using the present invention, the coaches and athletes can view either playbook via the playbook module 104 at any time. In another separate embodiment, the coach can create quizzes concerning their playbook.

In many embodiments of the present invention, a coach, using the playbook module 104 or the schedule keeping module 106, is able to fill out a series of contingencies. That is, the coach enters his or her preferences for the types of offensive strategies, formations, and/or plays to use against an opponent's defensive strategies, formations, and/or plays. The coach also enters his or her preferences for the types of defensive strategies, formations, and/or plays to use against an opponent's offensive strategies, formations, and/or plays.

A coach can review game-film of at least one of the coach's upcoming opponents and can enter details about the opponent in the schedule keeping module 106. Such details include the athletic prowess of the opponent's athletes, assorted weaknesses of the opponent, draw the strategies, formations, and plays used, and record the frequency with which the opponent used different strategies, formations, and plays.

From the schedule keeping module 106, the coach can upload footage from a game that the opponent participated in into the video editor submodule 106B. Within the video editor submodule 106B, the original game footage can be divided into many individual video clips by the coach to show at least one strategy, formation, and/or play per edited video clip. While still in the video editor submodule 106B, the coach can then input "situational data" for each video clip. In the present disclosure, "situation data" is any data that can be found and/or recorded prior to the start of the opponent's strategy and/or play. This includes indicating who is on offense or defense, the down and distance, the initial setup or formation that is used, the location of the ball, and the score of the game in that specific video clip. The coach can also input "results data" for each video clip, which here means any data concerning what is happening during, or is the end result of, the strategy and/or play. This includes what strategy and/or play was used, how many yards were gained or lost, if the pass was completed or intercepted, and if any points or goals were scored. Both coaches and athletes can enter the video editor submodule 106B at any time and view the video clips as well as the "situational data" and "results data" that are associated with each video clip. In addition, the video editor submodule 106B has a graphical interface for controlling the playing of the selected video clip, including features such as play, stop, slow-motion forward, slow-motion backward, skip to next video clip, and skip to previous video clip.

The information that is inputted can be used to find the certain tendencies that the upcoming opponent has in regards to certain items, like the opponent's use of certain offensive strategies, formations, and/or plays; use of certain defensive strategies, formations, and/or plays; the frequency of each; the effectiveness of each; and where certain strategies and plays are intended to go; among others. In addition, the coach could include notes and graphic aids that can be viewed by the other coaches and athletes, or, in one embodiment, be designated to only be viewed by specific coaches and/or athletes.

In the schedule keeping module 106, a coach can select all of the different strategies, formations, and plays that the upcoming opponent will be using. The coach can also label the selected strategies, formations, and plays. These configurations allow the system to pre-select the images to be used in the drill simulator submodule 106A. In many embodiments, the present invention is configured to adjust the opponent's strategies, formations, and plays with that of the coach's own team's strategies, formations, and plays similar to what is observed and practiced in a practice or in the actual competition. In many embodiments, during the selection and labeling process in the schedule keeping module 106, the coach will be able to view the names of the strategies, formations and plays that have already been selected and how many times those strategies, formations and plays have been selected by that coach.

In one embodiment, the coach will notify the athletes via the contact information and positions submodule 102A to log into the drill simulator submodule 106A to obtain a baseline assessment for the athletes. To do this, the coach will click a button in the schedule keeping module 106 that will send an email and/or text to all of the athletes, notifying them that the coach has completed inputting the data, and that it is now time for the athletes to start performing the drills in the drill simulator. The email or text will be sent from the present invention using contact information entered into the contact information and positions submodule 102A by the coach prior to the season.

The purpose of the baseline assessment is to determine what the athletes already know about the upcoming opponent prior to the coach teaching them.

There exist many embodiments of the baseline assessment feature within the schedule keeping module 106. When the drill simulator submodule 106A detects that a player is performing a drill for the first time in preparation for a specific upcoming opponent, it will initiate a baseline assessment, meaning it will set the level of difficulty for that drill to the default (baseline) level for that athlete. During the baseline assessment, which is used to create the default level for the athlete, the athlete will go through a predetermined amount of iterations of the drill. If the athlete achieves or exceeds a predetermined grade during the baseline assessment, the athlete will either continue performing the drill at the same level of difficulty as the baseline or advance to a higher level. If that athlete does not achieve a predetermined grade during the baseline assessment, he will be placed at a lower level of difficulty than the level used in baseline. If an athlete does not perform certain drills during the period when the baseline is available, the athlete will automatically be placed at a predetermined level for those drills. The baseline for all of the drills will reset for the athlete after the competition, in preparation for the next upcoming opponent.

In addition to the "situational data" and "results data" of the video clips that are input, the coach can provide questions and the answers for those questions within the video editor submodule 106B that would be used in the identification ("ID") drills that utilize video clips. In another embodiment, the present invention can have default questions, and answers to these questions can be generated based on the analysis and tendencies found of the upcoming opponent within the present invention.

In a preferred embodiment, the coach will have the ability to apply additional editing tools to each video clip in the video editor submodule 106B in order for those video clips to be better utilized in the drill simulator submodule 106A. Preferably, the coach will have use of two markers that will be placed within the time frame of the video clip: a "Start Marker" and an "End Marker." The "Start Marker" will be placed on the frame in the video clip where the opponent's strategy or play begins. The coach will then place an "End Marker" on the frame in the video clip where the opponent's strategy or play is fully developed and would be obvious to the viewer. For example, for American football, the coach could place the "Start Marker" on the frame when the football is initially being snapped to the quarterback. The coach will then place the "End Marker" on the frame when the ball carrier crosses the line of scrimmage after the linemen have executed their blocks, leaving out the end portion of the original video clip. Athletes that are participating in a drill within the drill simulator submodule 106A that focuses on items before the start of the strategy or play (i.e. identifying the formation), will view the portion of the video clip that begins with its original beginning (i.e. viewing the opponent getting into their formation) to where the "Start Marker" is (i.e. the moment before the strategy or play starts). Athletes that are participating in a drill within the drill simulator submodule 106A that focuses on items after the start of the strategy or play (i.e. identifying the strategy or play), will view the portion of the video clip that begins with its original beginning to where the "End Marker" is (i.e. the moment the strategy or play fully developed and obvious).

The feature of editing and inputting data for the video clips by the coach within the video editor submodule 106B posed a uniquely difficult technical problem to solve. For example, with the recent historic loss of browser support of Flash on modern day web devices, only more limiting web technologies now exist to render live video and to allow a user to manipulate the video clips. These current technologies have less power than Flash, and require the system developer to create the logic that normally would be otherwise effected by Flash or a video editing software tool. A unique solution using technologies like SVG, HTML5 video, and open source javascript video libraries was developed to crop, edit and label the video, although it is not the only configuration that will work.

In another embodiment, in the schedule keeping module 106 the coach may select, label, and submit a specific strategy, formation and/or play combination once, then separately enter the number of times the coach saw that specific combination on game-film and at the games he attended. The quantity for each combination will be weighed against the other combinations so that the combinations seen most by the coach from the games will be viewed the most by the players within the drill simulator submodule 106A. That is, the more a coach views a combination, the more heavily it will be weighted. The coach may also enter the same quantity for every combination so that every combination will be viewed the same number of times by the time of the competition.

In many embodiments, along with the labeling of strategies, formations and/or plays, the coach can also input "situational data" for a selected combination within the schedule keeping module 106. In one non-limiting example, the coach could provide how much time was left on the game clock when a given combination occurred. In another example, the coach could indicate what inning the selection occurred. In a third example, they could indicate how many points the opponent was ahead or behind by when the selected combination was used. In a fourth example, the coach could put in what the down and distance was when that selected combination occurred. In a fifth example, they could also indicate what hashmark and yardline the opponent was on when they used the selected combination. In some embodiments, the information provided can be displayed in the drills within the drill simulator submodule 106A before showing the animation or video clip, but after viewing the instructional page on the website. In other embodiments, that information can be displayed during the animation or video clip.

In a preferred embodiment, regarding drills utilizing video clips, the "situational data" will already be available to be utilized in the drills within the drill simulator submodule 106A from when the coach entered the video editor submodule 106B and input the "situational data" along with the "results data". In many embodiments, the coach will be able to input the "situational data" at a later time within the video editor submodule 106B. Overall, the information would foster greater understanding of when certain combinations may occur within the competition, narrow down the number of possible strategies, formations, and/or plays to expect in a given situation, enable the athletes to react and execute their assignments more quickly, and improve their situational awareness.

In many embodiments, during the selection and labeling process within the schedule keeping module 106, the coach can input information concerning audibles to certain combinations where it may be more advantageous to use than the originally selected strategy, formation and/or play combination. This would be done in order to see if an athlete can view a situation on the field or court, and change the strategy, formation, and/or play combination to something that would be more advantageous against what the opponent is planning on doing. The information that was inputted by the coach would be one of the answers available to the athlete during the drills. In many embodiments, for drills involving audibles that utilize video clips, the coach will input the correct audible while in the video editor submodule 106B. An athlete will be able to express their knowledge and execution of making audibles in any of the drills described in the drill simulator submodule 106A.

In one embodiment, the scouting report can be an uploaded document within the schedule keeping module 106. In a separate embodiment, the scouting report can also be created and auto-generated from the coach's previous selections and labeling of the opponent's different strategies, formations and/or plays from when the original selections and labels occurred and the data was inputted within the schedule keeping module 106, as well as from the analysis of and tendencies found from the "situational data" and "results data" that were inputted for the video clips in the video editor submodule 106B. All of that inputted information will fill in the scouting report templates found within the schedule keeping module 106. In another separate embodiment, the coach can also fill in the scouting report templates manually within the present invention. In another separate embodiment, the coach can create quizzes concerning a scouting report.

In one set of embodiments, the coach, while in the schedule keeping module, will be able to select, label, and submit the strategies, formations, and/or plays that are just similar to each other, but not directly related to a specific opponent. In another embodiment, the coach will also be able to select separate, individual video clips that contain similar strategies, formations, and/or plays from one or more game-films of one or more opponents, in the video editor submodule 106B, to be utilized as their own group in drills within the drill simulator submodule 106A, as opposed to utilizing video clips that are derived from one specific opponent. As an example, a basketball coach who saw that the team faced and had a lot of trouble playing against a number of teams that primarily used "motion offenses" last season, could select a wide variety of "motion offenses" in the schedule keeping module 106 and/or in the video editor submodule 106B. This could occur during the off-season and/or the pre-season, so the athletes would get experience in viewing and reacting to that type of offense in the drills within the drill simulator submodule 106A. As such, the coach will see which of the athletes are improving before the season begins, which of the athletes need additional help, and what strategies, formations, and plays the team could be using to be successful when facing teams that use "motion offenses" in at least some portion of the game.

In many embodiments, during the selection and labeling process, the coach can select a pre-packaged group of strategies, formations, and/or plays that are similar in style and structure within the schedule keeping module 106. The purpose of this is to speed up the process from selecting and labeling one item at a time to selecting a group of items at once. This is especially helpful when facing a team that specializes in one set of strategies, formations, and/or plays that are similar in style and structure. After selecting a pre-packaged group, the coach could add to, delete portions of, change, or modify that group to be more opponent-specific or to narrow or expand what the athletes need to view and experience in the drill simulator submodule 106A.

In one set of embodiments, during the selecting and labeling process within the schedule keeping module 106, the coach can label the strategies, formations, and plays in more generic terms as opposed to the specific names that they are typically given. The athletes, in turn, would provide those same generic terms as answers when viewing the corresponding animations in the drills within the drill simulator submodule 106A. For example, in American football, each formation and play has its own name, but each formation and play will fall under a certain category or group. For example, the traditional ISO, Power, and Zone plays out of the I Formation are very different when it comes to how the linemen block, where the fullback goes, and where the hole is for the halfback (or tailback) to run through and gain yards. However, they are all the same type of play. They are all "run" plays. Depending on the coach, they may want the athletes to have the ability to identify that the type of play they are viewing and reacting to is a "run" or "run play" rather than knowing the specific name of the play. When selecting the ISO, Power, and Zone plays, the coach can label each of them as "run" or "run play," and the athlete who views these corresponding animations will be able to provide the answer of "run" or "run play" after viewing them. In a separate embodiment, the athlete will also be able to provide a response to express how he would react after identifying that the play being viewed is a "run" or "run play."

In one embodiment, the coach could be able to perform against a sample set of reps of a specific drill at a specific position in the drill simulator submodule 106A. The purpose of this would be for the coach to "test out" a drill so the coach and the athlete will be on the same page when discussing what to look for in the animation or video clip.

In one embodiment, the coach will be able to create the upcoming opponent's strategies, formations, and plays within the schedule keeping module 106. These coach-made items will generate newly configured animations that can be selected, labeled, and submitted in the schedule keeping module 106 so that the athletes will view and respond to those items in the drills within the drill simulator submodule 106A. In one embodiment, the coach can disable some or all of the drills that utilize animations. In another embodiment, the coach can disable some or all of the drills that utilize video clips.

In another set of embodiments, the coach could enter the team administration module 106 and set the drills that utilize video clips in the drill simulator submodule 106A to only accept generic terms as the answers, with the generic terms being derived from the "situational data" and/or "results data" within the video editor submodule 106B that was entered by the coach. The coach could also name the strategy, formation, and/or play in each video clip with a generic term as opposed to a specific name within the video editor submodule 106B, which will then be the answers to those video clips in the drills within the drill simulator submodule 106A. Other more generic terms include: pass, bootleg, motion, zone, sprint, blitz, pass action, pop up, bunt, strike, ball, cross, screen, pick and roll, man-to-man, and shift, among others.

Later, the coach will review the grades and levels of difficulty earned from the athletes' baseline assessment in the grading module 108. Based on what the grades and levels are, the coach may make modifications to how he will introduce the upcoming opponent to the athletes and go through what strategies, formations, and plays the opponent uses during the first practice.

After the first practice, the coach will instruct the athletes to utilize the present invention again. This will include the athletes continuing to participate in the drills within the drill simulation submodule 106A that are assigned to them, but may also include, in one embodiment, reviewing a scouting report about the upcoming opponent that was made by the coach and found within the schedule keeping module 106 prior to participating in those drills. After the athletes have completed their drills, the coach will then look at the grades and levels within the grading module 108 that reflect the athletes' performance on those drills after the first practice. This information will be used to assist in creating the practice schedule for the second practice as well as assist the coaches on what to look for and possibly address during that practice. After the second practice, the athletes will be instructed to utilize the present invention, again. This routine, done on a daily basis, will help the athletes learn about, identify, and respond to the strategies, formations, and plays of the upcoming opponent up until the actual competition.

In many embodiments, the grades and levels are also made accessible to the coach by the grading module 108. This will inform the coach to what the athletes are doing well in or having trouble with. This will also assist the coach in developing a practice schedule for the next day that will address issues that the athletes currently have. The grades can be displayed to the coach in a number of ways, including, but not limited to: a line graph of a single athlete's grades that will show how well he has performed in the drills over the course of a day, a week, a month, a season, or a year, a line graph that displays a number of athletes' grades on a particular drill to compare their progressions over the course of time, or a display where the coach can view and compare the athlete's grades by sorting the athletes' latest grades in a particular drill in ascending or descending order, by the most recent submissions, or by the oldest submissions. Alternatively, the line graph can be limited to a particular level of difficulty, thus providing a coach with more specific per level information on the athlete's performance. The coach can also observe a series of per level line graphs arranged sequentially from the lowest level and highest level performed by the athlete.

After viewing the athletes' grades and levels in the grading module 108 and creating that day's practice schedule, any given coach is now able to go to the following practice and coach their athletes with the grades and levels in mind, addressing areas of concern, when possible. After the practice is over, the athletes will go back to the drill simulator submodule 106A of the present invention, and do their assigned drills again. Afterwards, the coaches will look up the new grades and levels, individually or collectively, on a display or on one or more line graphs, to see what changes have been made from one day to the next. The coach will then use the results to gauge how well the individual athletes, as well as the team, are doing in grasping their own strategies, formations, and plays; their opponents' strategies, formations, and plays; and will help determine how to structure the next day's practice to address new or similar concerns. This process of using the present invention and addressing key issues and concerns may continue each day up to and including the day of competition. In a number of embodiments, the present invention will also provide coaches with troubleshooting flowcharts that are found in the grading module 108, to help identify the possible underlying causes for why the athletes are not doing well on certain drills which would further improve the coach's ability to teach the athletes. In another embodiment, the present invention can provide specified recommendations, based on those from the flowcharts, to the coach concerning a specific athlete, if that athlete is not progressing in the drills.

In addition to grades, levels, displays, and graphs, the coach can also view other statistics in regards to athlete usage, including, but not limited to, the number of times an athlete clicks on the "Review" button, on what animations or clips he is giving incorrect responses, the number of reps performed in each drill, the number of sessions performed over a specific time period, the average number of reps per session, etc. This embodiment, found in the grading module 108, will provide the coach with insight into how the present invention is being used by the athletes, and can make key decisions based on that insight.

In one embodiment, the present invention may be used any time of the year, including, but not limited to: during the season, the pre-season, the post-season, the off-season, and other portions of that respective sport's yearly calendar. The purpose of this is to provide opportunities of learning for the athlete throughout the year.

Within the present invention, two teams in the same sport will be able to exchange an entire game-film, or all of the video clips from that game-film, with each other. For example, Team A will give one of their own game-films to Team B, and Team B will give one of their own game-films to Team A in the team administration module 102. Then, each team will enter "situational data" and results data" for each video clip in the newly exchanged game-film as part of their preparation for the competition against each other. In one embodiment, a team can obtain the "situational data" and "results data" for each video clip of a game-film of another team, if the data was entered by a separate team. For example, Team A and Team B make an exchange, and each enters the data into video clips of the newly exchanged game-film. Teams A and B use the data to prepare for the competition between each other. After that competition, Team A makes an exchange with Team C, and Team C requests the same game-film that Team B got from Team A. When Team C gets that game-film, it will include the data that Team B previously entered into that game-film. The purpose of this is to reduce the amount of time required to gather information about an opponent when utilizing game-film and video clips.

In another embodiment, the players will also be able to view a "Leaderboard," which will compare their respective performances on the drills with those of other players on his team, in his conference, region, state, or country.

In a separate implementation of the present invention, there will be an individual user version. In this version, the individual user is not connected or related to a team, but is a single player that wants to improve his own cognitive abilities in relation to his sport. The individual user could be an athlete that (1) had never played in a sport before and wants to get an idea of what is expected while participating in the sport, (2) just moved into the area and wants to prepare for how the new team and its opponents will perform, (3) had not received much time on the field or court in the previous season, and wants to improve the chances of participating in the competitions for the upcoming season, or (4) would want to improve their abilities during the season and would use this specific implementation of the present invention as a complement to, but separate from, the learning activities that they participate in with the team.

In one preferred embodiment, the individual user will initially setup their individual account through the administration module that includes addressing certain parameters, including entering name and contact information, determining how long each "practice week" is (for example, 7 days, 2 weeks, etc.), how many "practice weeks" there will be, inputting what the primary positions will be on offense and defense, what drills they would want to participate in, enter the names of the "opponents" that they will be facing in the future, among others. Each of the parameters mentioned above, as well as those not specifically mentioned, will have a default that can be changed initially and can also be changed or modified by the user at any time.

After the initial setup, the user can enter the present invention to participate in the drill sessions. In another preferred embodiment, the user will enter the playbook module 104 and select and label the specific plays, or select a pre-packaged set of plays that the virtual "team" will execute within the animations during the drills. In a separate preferred embodiment, the user will enter the schedule keeping module 106 to select and label specific strategies, formations, and plays that they will be facing in the drills, or can select a pre-packaged set of strategies, formations, and plays. In another preferred embodiment, the drills that they would participate in are the same types and functions as previously described. In one embodiment, all of the answers that the user expresses will be recorded and graded. They will be able to view their grades for a particular drill while participating in that same drills well as view all of their grades in the grade module 108. In a preferred embodiment, all of the drills will have levels of difficulty that were previously described. In another embodiment, the user can view a "Leaderboard" that will compare this performance in the drills with those of other users, and the "Leaderboard" can display these performances, by conference, region, state, or country in relation to the individual user.

Figure 2:
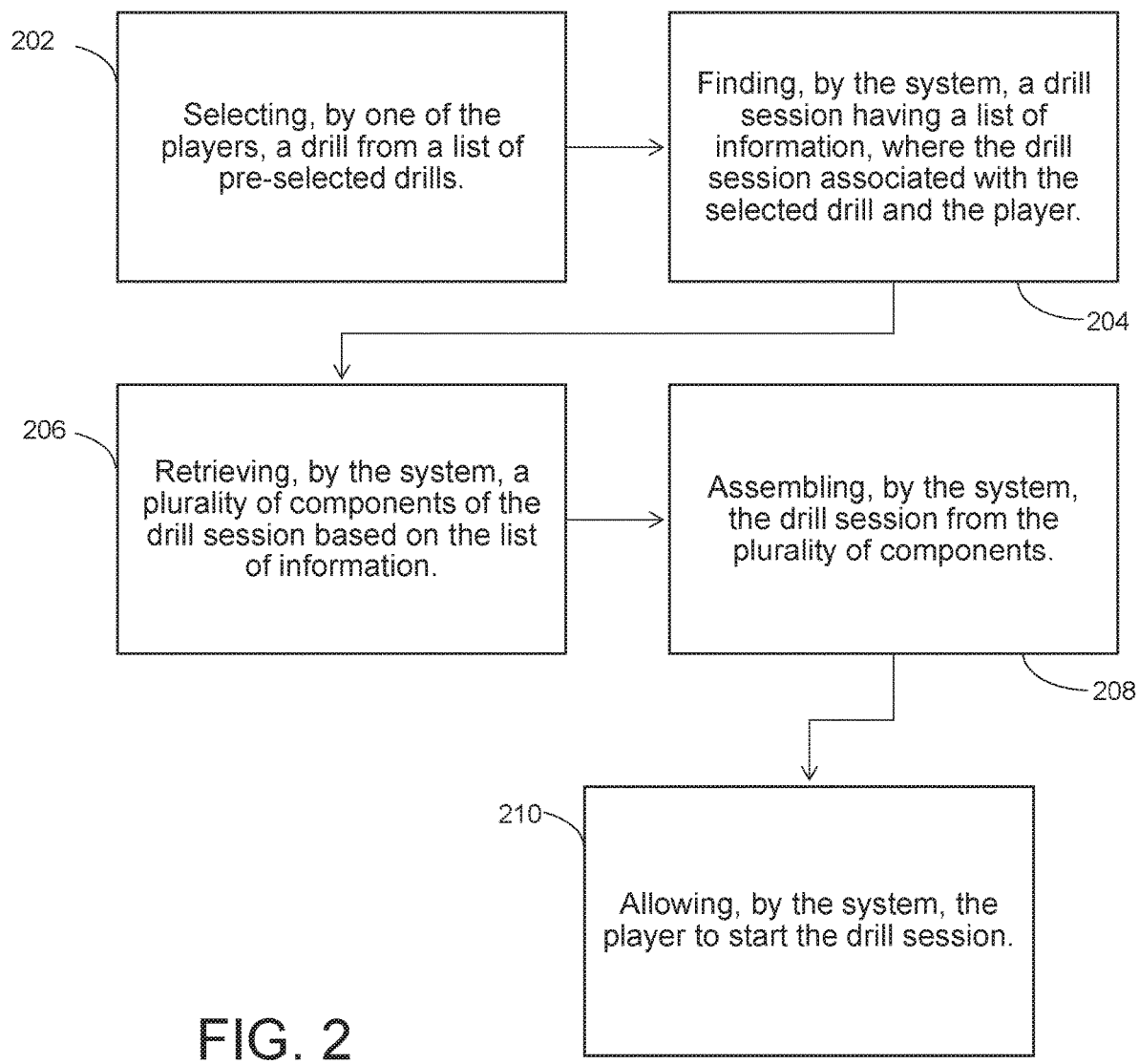
FIG. 2 shows a flow chart of an embodiment of the method in accordance with the present disclosure.

Referring to FIG. 2, a flow chart of an embodiment of the method in accordance with the present disclosure is shown.

When the athlete selects a specific drill from the drill simulator in step 202, whether during or after the baseline assessment, they may first see an instructions page that outlines what will happen and how the athlete will respond. This instructions page also has a link to an interactive video tutorial that provides a visual walkthrough of that drill with text to explain what the animation includes and what the user is able to do during the animation or video clip. From the instructions page, a subset of drill animation or video clip configurations is preloaded in the single page throughout steps 204-208, where the system finds a drill session having a list of information, where the drill session is associated with that team member in step 204, where the system retrieves the plurality of components that make up the drill session in step 206, and where the system assembles those components in the aforementioned single page. This ensures that after the start of the drill, every repetition is not delayed by this step. Further, this subset of drill animations or video clips selected for the athlete is determined by taking the team's drill configuration for the selected game, matching it with a list of information such as the team member's position, baseline session flag, level indicator, and count of how many times the team member has performed the drill. A baseline session flag will allow the system to determine whether a baseline session is being run, as opposed to a standard session. The position is determined for the specific drill to be the athlete's offensive position or defensive position depending on the offensive or defensive nature of the drill, allowing a single team member to hold multiple roster spots, as is common in high school sports. In this case, the athlete is able to select one of the available positions when engaging to start the drill. After the page has been assembled, the player is allowed to engage in the drill in step 210.

In some embodiments, team members can only view the strategies, formations, and plays that were previously selected and labeled by the coach. For example, if the team member is a quarterback, he will only have access to drills and animations that have to do with being the quarterback.

Figure 3:
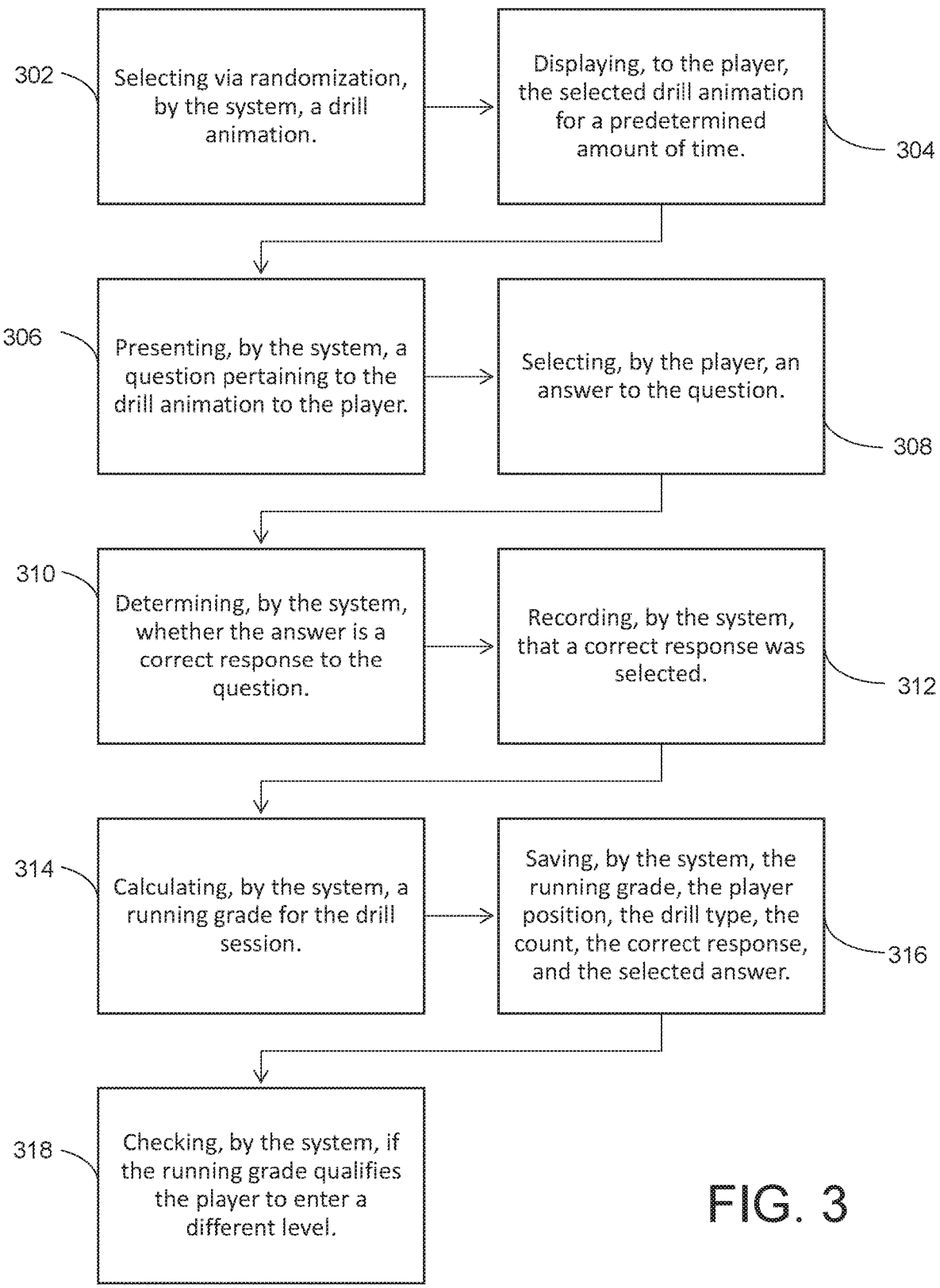
FIG. 3 shows a flow chart of an alternative embodiment of the method in accordance with the present disclosure.

Referring to FIG. 3, a flow chart showing an alternative embodiment of a method in accordance with the present disclosure is shown. Here, in step 302, the system selects a drill animation at random. In many embodiments, video clips will also be utilized in the drills as the drill animation. In some of those embodiments, the video clips will be specific to an athlete's position. The coach specifies which positions receive and view which video clips while in the video editor submodule. In other embodiments, video clips will be utilized in the drills, but all of the positions will view the same video clips without additional steps or actions needed to be taken by the coach. Both sets of embodiments are contingent and dependent on the filming capacity of the team doing the filming of the game. In addition to live game footage, cartoon-like or computer-generated images may be used.

In step 304, the drill animation is shown to the player for a predetermined amount of time. There are two types of exemplary drills that are utilized: ID drills and action drills. In a preferred embodiment, identification drills are when the player views an animation with virtual athletes on the screen that are doing something that replicates what a coach expects that the upcoming opponent will do. The identification drill may also consist of viewing an edited video clip containing actual game footage of the upcoming opponent participating in a previous competition. While or after viewing the animation or video clip, in step 306 the player is asked to identify and/or answer questions concerning what he viewed based on the corresponding diagram the coach selected and/or on what it was labeled as by the coach previously, and/or any other questions and answers created and added by the coach. In many embodiments, this type of drill can ask for the user to identify, respond to, and/or provide responses for up to 10 things from a single animation or video clip. The possible answer choices for the questions that are asked of the athletes are provided by the labeling and information entered by the coach when originally preparing for the upcoming opponent in the schedule keeping module, as described in step 308. For example, at the end of the animation or video clip, the athlete may need to identify the strategy, formation, and/or play that they viewed; identify what the center did on the play; or identify what the best passing option was for that particular strategy or play. In some embodiments, the answers and answer choices will be in word form. In other embodiments, the answers and answer choices will be in the form of diagrams.

There are a number of embodiments specifically concerning the animations in the ID drills. Some animations will have no movement while other animations will have at least one of the virtual athletes moving, showing the development of a number of specific strategies and/or plays. For example, if the user is on special teams in football, they will see and participate in drills pertaining to kick-off formations, kick-off plays, punt formations, among many others. For another example, if the user is a quarterback, he might engage in a pre-snap defense ID drill. In this instance, the pre-snap defense ID drill can have a number of embodiments. The first has none of the virtual athletes moving. This will train the quarterback to recognize a defensive formation and/or play without any virtual athletes moving. Alternatively, the drill may have members of the secondary move to provide the quarterback with some idea of what the defensive play is. The drill may also have all of the defensive athletes move, allowing a quarterback to have more clues as to what the defensive play is and how best to exploit it. For an outfielder playing in left field in baseball, he may see a batter hit the ball into right field. Based on how many runners there are and which bases they are on before the pitch, the outfielder will need to identify where the ball will end up and indicate where he needs to be during the play. In one embodiment, the coach will select a paused video clip, and have a picture of the video clip taken at the appropriate frame, to be used in place of a video clip being played during the drill. In another embodiment the video clip will be allowed to play through in its entirety.

Actions drills are the second set of exemplary drills used in the present disclosure. These are drills where the athlete will have to respond or react to the virtual athletes in an animation before the end of the animation, or respond or react to actual athletes in a video clip before the end of the video clip. In some embodiments, the athlete can provide a response after the end of the animation or video clip. The answer to this type of drill corresponds to a reaction the user would have during a competition, such as moving in a certain direction, accomplishing a certain task during a strategy, or identifying a specific virtual player and indicating where they are going. For example, if the user is a defensive football player, and in an animation, they see the offensive virtual player on the screen with a football going to the right, the user needs to indicate what direction they should move in in order to tackle the offensive player. Alternatively, the same user views an offensive play developing in a video clip and recognizes the play is designed for the ball-carrier to go to the right. In either example, in a preferred embodiment, the user will indicate through pressing a key on a keyboard, clicking a mouse on a portion of a computer screen, tapping a portion of a cellphone or smartphone touchscreen, or moving while connected to a motion-detection device that the user wants to go to the right. All of the drills are a combination of what the opponent may do during the competition, as well as what the athletes are supposed to do while in their own formations, all while executing their own strategies and plays against their upcoming opponent.

In a preferred embodiment, video clips will also be utilized in the identifications drills and action drills as well as the "situational data" and "results data" for each video clip that was entered by the coach in the video editor. In a preferred embodiment, the "situational data" and "results data" for each of the video clips serve as the answers for those video clips when they are utilized in the drills within the drill simulator where specific data is relevant to a specific drill. For example, a coach inputs "situational data" for video clip A that includes labeling the formation as "I Formation Right," and also inputs "results data" for video clip A that includes labeling the play as "Toss Right," and the direction of the play as going to the "Right." Subsequently, the athlete views video clip A during an identification drill within the drill simulator. If the present invention asks to identify the formation, the athlete will answer with "I Formation Right." If the present invention asks to identify the play, the athlete will answer with "Toss Right." If the present invention asks to identify the direction of the play, the athlete will answer with "Right." In an action drill within the drill simulator, the athlete will be successful when viewing video clip A by indicating the direction in which the play is going, or where they need to go in reaction to the play. In either case, the response could be "Right."

In one embodiment, whether participating in an ID drill or in an action drill, after an athlete submits an answer or response within the drill simulator, the system of the present invention will inform the user if their selection was correct or incorrect in step 310. If incorrect, the present invention will display the correct answer. If the answer is correct, the system records the correct answer in step 312. In another separate embodiment, all of the answers will be collected for each drill and given a percentage grade based on how many were correct out of the total number of questions or responses. In many embodiments, the athlete will be able to see the grade and what level of difficulty they are currently on while participating in the drill within the drill simulator, and in the grading module after they are finished with the drill.

The present invention has many embodiments when it comes to the connection between levels of difficulty and the drills that use the animations and video clips. In one set of embodiments, the level of difficulty the athlete is currently on determines the play speed of the animation or video clip in the drill. In one example, Level 0 would be the easiest for the athletes to respond correctly to. At this level, each animation or video clip will be slower than the speed of movement that would be seen in competition to allow the athletes the time to figure out what they are viewing, and how to respond to it correctly. If some of the athletes show a high proficiency at Level 0, the present invention will advance those athletes to Level 1. At Level 1, the animations or video clips will be going faster than Level 0, but still not at the speed of movement seen in competition. If some of the athletes show a high proficiency at Level 1, the present invention will advance those athletes to Level 2. At Level 2, the animations or video clips will be going as fast as competition. If some of the athletes show a high proficiency at Level 2, the present invention will advance those athletes to Level 3. At Level 3, the animations or video clips will be going faster than the speed of movement seen in competition. If some of the athletes show a high proficiency at Level 3, the present invention will advance those athletes to Level 4. At Level 4, the animations or video clips will be going much faster than the speed of movement seen in competition.

In a separate set of embodiments involving levels of difficulty, as an athlete advances in the level of difficulty, the animation or video clip utilized within the drill simulator will be incrementally trimmed, starting from the end, going backwards. For example, in American football, Level 0 shows an animation or video clip up until the ball carrier crosses the line of scrimmage, and the total length of time of the animation or video clip is 9 seconds. At Level 1, the last 0.5 seconds of the animation or video clip is taken away, leaving 8.5 seconds of the animation or video clip to be shown, and ending before the ball carrier reaches the line of scrimmage. At Level 2, the last 1 second of the animation or video clip is taken away, leaving 8 seconds of the animation or video clip to be shown, and ending with the ball carrier further away from the line of scrimmage. At Level 3, the last 1.5 seconds of the animation or video clip is taken away, leaving 7.5 seconds of the animation or video clip to be shown, and ending with the ball carrier even further away from the line of scrimmage. At Level 4, the last 2 seconds of the animation or video clip is taken away, leaving 7 seconds of the animation or video clip to be shown, and ending with the ball carrier even more further away from the line of scrimmage.

The reduction of the viewable animation or video clip that occurs when an athlete advances in difficulty is made by the present invention. The present invention can determine how much time is taken from the end of the animation or video clip based on an algorithm that includes the total length of the animation or clip and the level that the athlete is currently at. In summary, the drills using animations or video clips may be displayed faster (e.g. a video on 1.5× speed) or may have time lopped off the end as a user progresses through the various levels. In additional embodiments, the levels of difficulty may include adding sensory distractions, altering how the animation or game-film clip is viewed, the mobile device used during the drill vibrating, or the addition of related and unrelated sounds or noises.

Regardless of the type of difficulty used and their corresponding levels, in some embodiments, the entirety of the strategy or play can be shown. In other embodiments, only a certain portion of the strategy or play is shown. The reason for why the levels of difficulty change the timing of the animations and video clips is because in a competition, the athletes will only have a certain amount of time from the start of the strategy or play to view, process, identify, and react to it correctly. In stressing this mental process, the athletes are forced to process the applicable information more quickly in order to be successful. In one embodiment, the athlete will have a predetermined amount of time to provide responses after viewing the animation or video clip. If the athlete is not able to provide responses to some portions of the drill in the predetermined amount of time, those nonresponses will be registered as incorrect answers.

In a highly preferred embodiment, as shown in step 314, the system will calculate a running grade for the team player as each iteration of the drill is performed. This information is saved in step 316. Successfully answering questions will raise this running grade while incorrectly answering questions will lower this grade. Each level has a threshold where a running grade of a certain amount will cause the team member to increase in level, which is determined in step 318. The highest level should reflect the maximum likelihood that the player will answer the question correctly. Note that this is not a true statistic maximum (i.e., 100%) but a maximum capable based on the characteristics of the player. It should be noted that a minimum threshold exists where if a player obtains a running grade below that threshold, the player will get their level indicator lowered to reflect them being in a lower level.

In a preferred embodiment, all animations viewed in the drill simulator are viewed from an eye-level, first-person point-of-view at each and every athlete's position on the field or court. In some embodiments, the present invention emulates 3-dimensional ("3D") movement using fading, moving, and scaling effects of images against a background playing field to achieve 3D-like animations from any player position. The animations were developed by taking pictures of several fields and courts at eye-level, as well as at other heights, from a number of different positions on the fields and courts. Those pictures were then digitally annotated, and then the annotated image was transferred into the system of the present invention. Mathematical derivations and empirical data of sport specific fields and courts were used to achieve correct scaling for athletes at different distances away from viewpoint. In other embodiments, the animations are displayed in 3D (i.e., not emulated). The animations can be generated by creating a digital representation of a particular field or court and virtual players, importing the illustration into an external video processing program, and then recording the movements of animated players from a number of viewpoints.

The 2-dimensional ("2D") animation itself is rendered in the limitations of the web technologies of the current time, to effect a 3D like representation of drills; however, the system has the right to employ future technologies to effect the spirit of the system's animations. Preferably, the system employs technologies such as CSS 3.0 and HTML5, which enable both web and mobile applications to appear 3-dimensional while displayed in a 2-dimensional plane, with transitions of changing properties of an image like position, opacity, zoom level, and size. The drills are displayed by each player viewing an image itself superimposed on a background image. The system moves players behind and in front of each other in one movement. The system changes the player images in size to make it appear as if they are moving away and closer. The system also removes player images and adds other player images to make the effect of players moving their body shape and maneuvering.

The 3D animations will be rendered by current technologies of its time and may evolve as technology changes, but to still be in the spirit of the invention. In the current technology, the 3D animations may be implemented by using a 3D software and generating a video file that is supported by the web browsers, e.g., mpg. 3D software that generally utilize complex computations to derive the angle of the objects. Another approach could be that a separate process generates the 3D video files from scratch, in order to optimize 3D rendering for athletic animations.

In one embodiment, the selection, labeling, submission of specific strategy, and formation and/or play combinations (offensively, defensively, or in combination) in the schedule keeping module will be recorded and tallied by the present invention. If a specific strategy, formation and/or play combination is submitted again, the present invention will recognize the second submission. Preferably, the number of occurrences of the selecting, labeling, and submitting of the different combinations will correlate with the number of times the coach observes those combinations in game-film or at attended games. At the end of this process, the total number of submissions for each different submitted strategy, formation and/or play combination will be weighed against each other when the present invention selects a combination, at random, to be viewed by the athlete during a drill within the drill simulator. For example, if combination A is submitted five times by the coach and combination B is only selected once, the probability of an athlete viewing, reacting, and responding to combination A in a drill is five times more likely than combination B. This weighted randomization will give an athlete the experience of interacting more often with the opponent's primary plays than plays that are used more sparingly. This will provide the athlete with a better competition-like experience. Information regarding the number of times that a combination is selected, labeled, and submitted will be available to the coach.

In many embodiments, a 3-D environment will be utilized in the drills, within the drill simulator, in place of using animations. The user (the athlete) will be able to freely move within the 3-D environment as a player from a first-person, eye-level view before and/or after the play starts: starting where they typically would be at their position and ending at the spot where he should be in order to help the team become successful in that scenario. In soccer, the designated spot at the end of the drill could be where the athlete needs to get to in order to get the ball on a pass from a teammate, or to be in the position to block a shot that may go into the goal if that user was the goalie. In lacrosse, basketball, and hockey, the designated spot could be where to go when an athlete is appropriately reacting to the opponent's offensive movements and passing, or to go to the open area within the opponent's defense to be better able to score for their team. In American football, the designated spot could be where he should be to tackle the ball carrier, the gap to run through to gain yards, the area to throw from and who to throw to, the area to be in for pass coverage, etc. The ability to do this would be based on the user's interactions with the present invention during the drill, including, but not limited to: pressing keys on a keyboard, clicking a mouse on the screen, moving a mouse on the screen, tapping the touchscreen of a cellphone, smartphone, tablet, or computer, tilting a cellphone or smartphone in a specific direction, or physically moving with a motion-detection device attached to the body.

When introducing elements of the present disclosure or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements.

While the disclosure refers to exemplary embodiments, it will be understood by those skilled in the art that various changes may be made and equivalents may be substituted for elements thereof without departing from the scope of the disclosure. In addition, many modifications will be appreciated by those skilled in the art to adapt a particular instrument, situation or material to the teachings of the disclosure without departing from the spirit thereof. Therefore, it is intended that the disclosure not be limited to the particular embodiments disclosed.

What is claimed is:

1. A method comprising:
    accessing, by at least one player on a sports team, a client-server computer system;
    obtaining schedule data from a schedule keeping module on the client-server computer system;
    obtaining, based on the schedule data, data relating to at least one strategic tendency of at least one opposing team of the sports team;
    selecting, by the at least one player, from the client-server computer system, a drill from a list of pre-selected drills;
    finding, by the client-server computer system, a drill session having a list of information, where the drill session is associated with a selected drill and the at least one player, and where the list of information comprises the data relating to at least one strategic tendency of the at least one opposing team of the sports team;
    retrieving, by the system, a plurality of components of the drill session based on the list of information;
    assembling, by the client-server computer system, the drill session from the plurality of components;
    starting, by the client-server computer system, the drill session, where the drill session comprises a plurality of drill animations; and
    selecting, via weighted-randomization, a drill animation from the plurality of drill animations, where the weighted-randomization is weighted based on the data relating to the at least one strategic tendency of the opposing team of the sports team.

2. The method of claim 1, where the data relating to the at least one strategic tendency of the at least one opposing team of the sports team comprises:
    frequency of use of previously selected offensive strategies of the at least one opposing team;
    effectiveness of previously selected offensive strategies of the at least one opposing team;
    intended targets of each previously selected offensive strategy of the at least one opposing team;
    frequency of use of previously selected defensive strategies of the at least one opposing team;
    effectiveness of previously selected defensive strategies of the at least one opposing team;
    intended targets of each previously selected defensive strategy of the at least one opposing team;
    frequency of formations previously used by the at least one opposing team;
    effectiveness of formations previously used by the at least one opposing team;
    intended targets of each formation previously used by the at least one opposing team;
    frequency of plays previously used by the at least one opposing team;
    effectiveness of plays previously used by the at least one opposing team;
    intended targets of plays used by the at least one opposing team;
    or
    any combination thereof.

3. The method of claim 1, where the data relating to the at least one strategic tendency of the at least one opposing team of the sports team comprises notes, graphic aids, or any combination thereof.

4. The method of claim 1, further comprising, by at least one coach on the sports team, inputting, into the schedule keeping module on the client-server computer system, the data relating to the at least one strategic tendency of the opposing team of the sports team.

5. The method of claim 1, further comprising displaying, to the at least one player, a set of instructions of how to perform the drill.

6. The method of claim 1, wherein the list of information further comprises:
    a unique session I.D.;
    a drill type;
    a player position for the at least one player;
    a baseline session flag;
    a level indicator corresponding to a predetermined amount of levels;
    a count of how many times the player has performed the drill;
    or any combination thereof.

7. The method of claim 6, further comprising the steps of:
    displaying, to the at least one player, a selected drill animation for a predetermined amount of time;
    presenting, by the client-server computer system, a question pertaining to a drill animation to the at least one player;
    selecting, by the at least one player, an answer to the question; and
    determining, by the client-server computer system, whether the answer is a correct response to the question.

8. The method of claim 7, wherein the steps of displaying and presenting are performed simultaneously.

9. The method of claim 7, further comprising the steps of:
    recording, by the system, that a correct response was selected;
    calculating, by the system, a running grade for the drill session;

saving, by the system, the running grade, a position of the at least one player, a drill type, a count, the correct response, and a selected answer; and checking, by the system, whether the running grade qualifies the at least one player to enter a different level.

10. The method of claim 9, further comprising the step of:

increasing, by the system, a level of the at least one player.

11. The method of claim 9, further comprising the step of:

decreasing, by the system, a level of the at least one player.

12. The method of claim 9, where whether the running grade qualifies the at least one player to enter a different level is based on a likelihood that the at least one player selects the correct response to the question, and wherein a maximum level corresponds to a maximum likelihood that the at least one player will select the correct response to the question.

\* \* \* \* \*